(12) United States Patent
Li

(10) Patent No.: US 11,902,362 B2
(45) Date of Patent: Feb. 13, 2024

(54) TOPOLOGY-AWARE LOAD BALANCING METHOD AND APPARATUS, AND COMPUTER DEVICE

(71) Applicant: INSPUR SUZHOU INTELLIGENT TECHNOLOGY CO., LTD., Jiangsu (CN)

(72) Inventor: Fengqi Li, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/271,456

(22) PCT Filed: Sep. 29, 2021

(86) PCT No.: PCT/CN2021/121912
§ 371 (c)(1),
(2) Date: Jul. 9, 2023

(87) PCT Pub. No.: WO2023/279555
PCT Pub. Date: Jan. 12, 2023

(65) Prior Publication Data
US 2023/0412674 A1 Dec. 21, 2023

(30) Foreign Application Priority Data

Jul. 8, 2021 (CN) .......................... 202110771506.2

(51) Int. Cl.
*H04L 29/08* (2006.01)
*H04L 67/101* (2022.01)
(Continued)

(52) U.S. Cl.
CPC ............ *H04L 67/101* (2013.01); *H04L 41/12* (2013.01); *H04L 47/125* (2013.01)

(58) Field of Classification Search
CPC ...... H04L 67/101; H04L 41/12; H04L 47/125
See application file for complete search history.

(56) References Cited

U.S. PATENT DOCUMENTS

2004/0114569 A1   6/2004   Naden et al.
2004/0128397 A1   7/2004   Glasmann et al.
(Continued)

FOREIGN PATENT DOCUMENTS

| CN | 101547139 A | 9/2009 |
| CN | 103685054 A | 3/2014 |

(Continued)

OTHER PUBLICATIONS

Lan, Yuan-Liang, Kuochen Wang, and Yi-Huai Hsu. "Dynamic load-balanced path optimization in SDN-based data center networks." 2016 10th International Symposium on Communication Systems, Networks and Digital Signal Processing (CSNDSP). IEEE, 2016.

*Primary Examiner* — Walli Z Butt
(74) *Attorney, Agent, or Firm* — IPro, PLLC

(57) ABSTRACT

A topology-aware load balancing method includes: acquiring load balancing configuration information, determining, based on the configuration information, whether a plurality of backend service endpoints for load balancing are located on different nodes; in response to the backend service endpoints for load balancing being located on different nodes, for each node, regularly issuing a command for polling the backend service endpoints on the node, acquiring topology information of the different nodes, as well as health statuses and a link quality of the backend service endpoints; calculating priorities of the backend service endpoints based on the topology information, the health statuses and the link quality, configuring a service response endpoint for load balancing based on the priorities; in response to at least one of the topology information, the health statuses and the link (Continued)

quality being changed, recalculating priorities of the back-end service endpoints, adjusting the service response endpoint based on the priorities.

20 Claims, 2 Drawing Sheets

(51) Int. Cl.
*H04L 41/12* (2022.01)
*H04L 47/125* (2022.01)

(56) References Cited

U.S. PATENT DOCUMENTS

| | | |
|---|---|---|
| 2005/0105475 A1 | 5/2005 | Norrgard et al. |
| 2010/0333104 A1 | 12/2010 | Unnikrishnan et al. |
| 2012/0284296 A1* | 11/2012 | Arifuddin ........... H04L 67/1027 709/219 |
| 2020/0042406 A1* | 2/2020 | Natanzon .................. G06F 8/65 |
| 2020/0084269 A1* | 3/2020 | Husar .................. H04L 45/7453 |
| 2022/0046084 A1* | 2/2022 | Nair ........................ H04L 47/20 |

FOREIGN PATENT DOCUMENTS

| | | |
|---|---|---|
| CN | 110035468 A | 7/2019 |
| CN | 110838944 A | 2/2020 |
| CN | 112929408 A | 6/2021 |
| CN | 113225403 A | 8/2021 |

* cited by examiner

TOPOLOGY-AWARE LOAD BALANCING METHOD AND APPARATUS, AND COMPUTER DEVICE

CROSS-REFERENCE TO RELATED APPLICATION

The present disclosure claims priority to Chinese patent application No. 202110771506.2, titled "TOPOLOGY-AWARE LOAD BALANCING METHOD AND APPARATUS, AND COMPUTER DEVICE", filed on Jul. 8, 2021 before the CNIPA, China National Intellectual Property Administration, which is incorporated herein in its entirety by reference.

TECHNICAL FIELD

The present disclosure relates to the technical field of load balancing, in particular to a topology-aware load balancing method and apparatus, and a device.

BACKGROUND

In the era of cloud computing, business transformation is also constantly carried out. With the continuous development of cloud computing, the scale of a cloud computing data center is getting larger and larger. Under a large-scale data center environment, in the case that hardware assets are fixed, the computing density carried by a unit computing resource is getting higher and higher through a reasonable planning and technology optimization. However, in the case that hardware assets are fixed, network bandwidth resources are also fixed, thus the network bandwidth resources of the data center are becoming more and more precious. An urgent problem currently to be solved by the data center is how to use the fixed network bandwidth resources reasonably and efficiently to provide users with optimum services.

SUMMARY

In view of this, an object of embodiments of the present disclosure is to provide a topology-aware load balancing method and apparatus, and a computer device.

In view of the above object, an aspect of embodiments of the present disclosure provides a topology-aware load balancing method, including: acquiring load balancing configuration information issued by a user, and determining, based on the configuration information, whether a plurality of backend service endpoints for load balancing are located on different nodes; in response to determining that the plurality of backend service endpoints for load balancing are located on different nodes, for each of the different nodes, regularly issuing a command for polling the backend service endpoints on the respective node, and acquiring topology information of the different nodes, as well as health statuses and a link quality of the plurality of backend service endpoints; calculating priorities of the plurality of backend service endpoints based on the topology information, the health statuses and the link quality, and configuring a service response endpoint for load balancing based on the priorities; and in response to the topology information being changed and/or the health statuses and/or the link quality being changed, recalculating priorities of the plurality of backend service endpoints, and adjusting the service response endpoint based on the priorities.

In some embodiments, the method further includes: regularly polling, by a topology awareness module of each of the different nodes, the backend service endpoints on the respective node to acquire the topology information of each of the different nodes, and uploading the topology information to a control module; and regularly polling, by a health monitoring module of each of the different nodes, the backend service endpoints on the respective node to acquire the health statuses and link information of the backend service endpoints, and uploading the health statuses and the link information to the control module.

In some embodiments, in response to the topology information being changed and/or the health statuses and/or the link quality being changed includes: acquiring current topology information by the topology awareness module, and determining whether the current topology information is same as topology information acquired previously; in response to the current topology information being different from the topology information acquired previously, determining that the topology information is changed, and uploading the current topology information to the control module; and acquiring current health statuses and current link information by the health monitoring module, uploading the current health statuses and the current link information to the control module, and determining whether the health statuses and the link quality are changed by the control module based on the current health statuses, the current link information, and health statuses and link information acquired previously.

In some embodiments, the method further includes: in response to the current topology information being the same with the topology information acquired previously, determining that the topology information is not changed, and omitting uploading the current topology information to the control module.

In some embodiments, the calculating priorities of the plurality of backend service endpoints based on the topology information, the health statuses and the link quality includes: calculating an average link overhead based on link overheads in the link quality, and calculating, based on the average link overhead, a topology weight, a link weight, a link overhead weight, a link stability weight and a delayed change weight, load balancing priorities of the plurality of backend service endpoints.

In some embodiments, the calculating, based on the average link overhead, a topology weight, a link weight, a link overhead weight, a link stability weight and a delayed change weight, load balancing priorities of the plurality of backend service endpoints includes: calculating the priorities of the plurality of backend service endpoints through the following formula:

$$P = A_1 T + A_2\left(A_3 M + A_4\left(\frac{(x_1 - M)^2 + (x_2 - M)^2 + \ldots + (x_n - M)^2}{n}\right)\right) + L$$

wherein $A_1$ represents the topology weight of a topology T, $A_2$ represents the link weight, $x_1, x_2, \ldots,$ and $x_n$ represent the link overhead of a respective link, $A_3$ represents the link overhead weight, $A_4$ represents the link stability weight, L represents the delayed change weight, and M represents the average link overhead.

In some embodiments, the configuring a service response endpoint for load balancing based on the priorities includes: ranking the priorities of the plurality of backend service endpoints from high to low, and taking a backend service endpoint with the highest priority as the service response endpoint for load balancing.

In some embodiments, the adjusting the service response endpoint based on the priorities includes: ranking the recalculated priorities of the plurality of backend service endpoints from high to low, and taking a backend service endpoint with the recalculated highest priority as the service response endpoint for load balancing.

Another aspect of the embodiments of the present disclosure provides a topology-aware load balancing apparatus, including: a first module, configured to acquire load balancing configuration information issued by a user, and determine, based on the configuration information, whether a plurality of backend service endpoints for load balancing are located on different nodes; a second module, configured to: in response to determining that the plurality of backend service endpoints for load balancing are located on different nodes, for each of the different nodes, regularly issue a command for polling the backend service endpoints on the respective node, and acquire topology information of each of the different nodes, and health statuses and a link quality of the plurality of backend service endpoints; a third module, configured to calculate priorities of the plurality of backend service endpoints based on the topology information, the health statuses and the link quality, and configure a service response endpoint for load balancing based on the priorities; and a fourth module, configured to recalculate priorities of the plurality of backend service endpoints in response to the topology information being changed and/or the health statuses and/or the link quality being changed, and adjust the service response endpoint based on the priorities.

Still another aspect of the embodiments of the present disclosure provides a computer device, including: at least one processor; and a memory storing a computer instruction capable of running on the processor, wherein the instruction, when executed by the processor, performs steps of the above method.

BRIEF DESCRIPTION OF THE DRAWINGS

In order to more clearly describe technical solutions of the embodiments of the present disclosure or the related art, drawings that are to be referred for description of the embodiments or the related art will be briefly described hereinafter. Apparently, the drawings described hereinafter merely illustrate some embodiments of the present disclosure, and those skilled in the art may also derive other embodiments based on the drawings described herein without any creative effort.

DETAILED DESCRIPTION OF THE EMBODIMENTS

In order to make the objects, technical solutions, and advantages of the present disclosure more clear, embodiments of the present disclosure are further described in detail below with reference to specific embodiments and the accompanying drawings.

It should be noted that all expressions "first" and "second" used in the embodiments of the present disclosure are intended to distinguish two distinct entities or parameters with the same name. As can be seen, "first" and "second" are only used for the convenience of expression, and should not be construed as a limitation on the embodiments of the present disclosure, which will not be described one by one in the subsequent embodiments.

Traditional load balancing strategies fail to perceive topology information of backend service endpoints for load balancing, which results in the following two problems. Firstly, a load balancing system may not effectively and reasonably plan resources for backend service endpoints, so that backend service endpoints providing services for a load balancing front-end are not optimal, the user experience is poor, and data center resources can not be used reasonably. Secondly, a user may reasonably plan the topology of the backend service endpoints for load balancing to achieve the optimal system, however, when the topology of the backend service endpoints for load balancing changes due to faults, insufficient computing resources and the like, the system may not automatically adjust load balancing rules, instead, operation and maintenance personnel need to manually adjust the rules based on a new topology, resulting in high risk of errors and high operation and maintenance costs.

Figure 1:
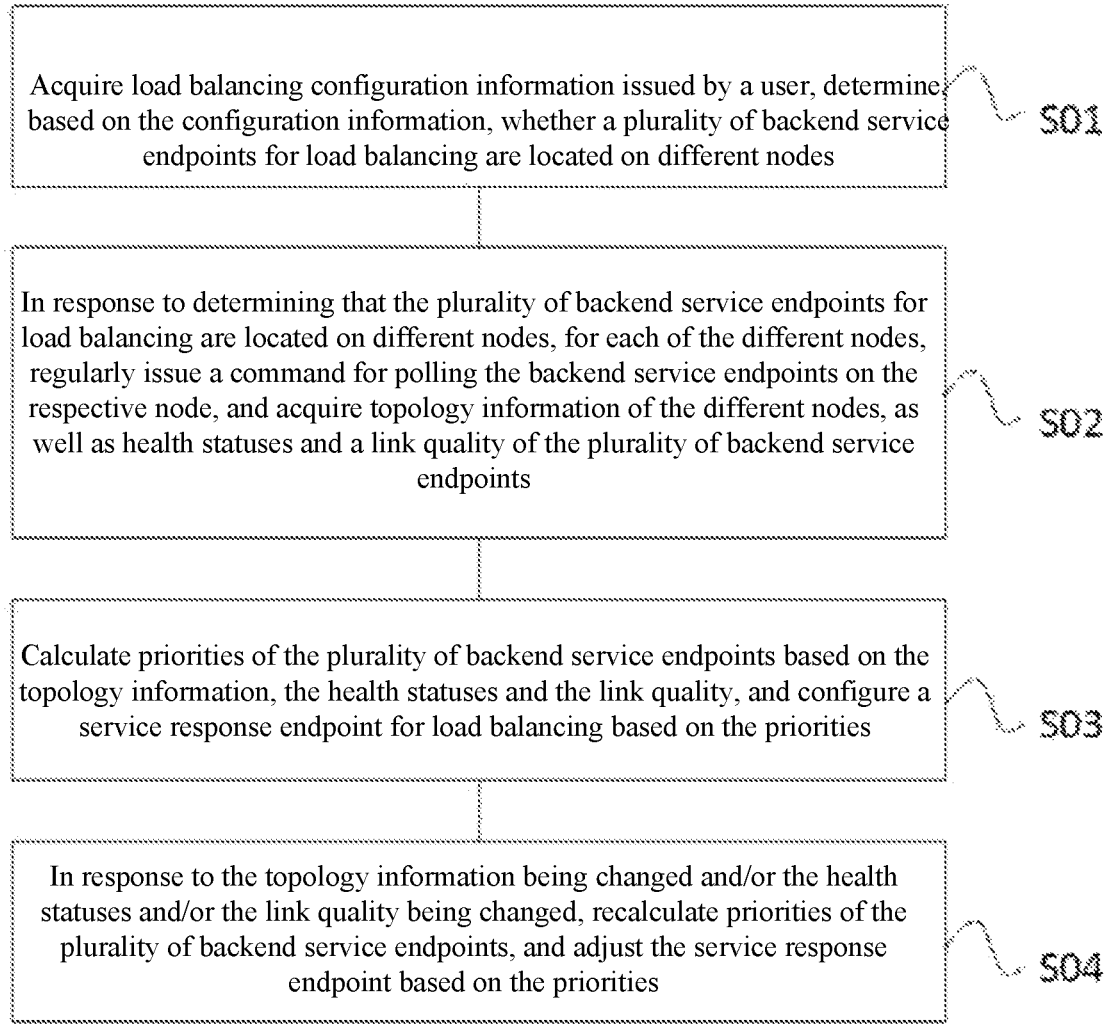
FIG. 1 is a schematic diagram illustrating a topology-aware load balancing method according to an embodiment of the present disclosure.

In view of the above, in a first aspect of embodiments of the present disclosure, an embodiment of a topology-aware load balancing method is provided. FIG. 1 is a schematic diagram illustrating a topology-aware load balancing method according to an embodiment of the present disclosure. As shown in FIG. 1, for example, the embodiment of the present disclosure includes performing steps described below in a control module.

At S01, load balancing configuration information issued by a user is acquired, and it is determined, based on the configuration information, whether a plurality of backend service endpoints for load balancing are located on different nodes.

At S02, if the plurality of backend service endpoints for load balancing are located on different nodes, topology information of these different nodes, and health statuses and a link quality of the backend service endpoints are acquired by regularly issuing, to each of these different nodes, a command for polling the backend service endpoints on the respective node.

At S03, priorities of the backend service endpoints are calculated based on the topology information, health statuses and link quality, and a service response endpoint for load balancing is configured based on the priorities.

At S04, in response to the topology information being changed and/or the health statuses and/or the link quality being changed, priorities of the backend service endpoints are recalculated, and the service response endpoint is adjusted based on the priorities.

This embodiment is mainly applied to load balancing in an environment of large-scale data centers, and used for perceiving the topology of the backend service endpoints for load balancing and adjusting the backend service endpoints that provide services for load balancing based on a topology perception result to achieve the optimal load balancing performance. When the topology of the backend service endpoints changes due to faults, computing resources and the like, a load balancer may adjust links based on the collected latest topology information, such that the network bandwidth resource utilization rate and user experience are greatly improved.

In this embodiment, the topology-aware load balancing mainly includes a topology awareness module, a control module, a health monitoring module, and an event processing module. The control module is responsible for issuing user-configured load balancing rules and presenting load balancing services. As a central module of the entire system, the control module interacts with the topology awareness module, the health monitoring module, and the event processing module at the same time, and carries out intelligent analysis and automatically selects a load balancing backend service endpoint of the optimal link based on an interaction result to provide services for load balancing. The topology awareness module is responsible for perceiving the topology information of the backend service endpoints based on backend service endpoint information issued by the control module, and transmitting the perceived topology information to the control module through the event processing module. The topology awareness module also perceives changes in the topology of the backend service endpoints, and transmits a new topology to the control module through the event processing module when perceiving that the backend topology is changed. The topology awareness module is enabled on nodes when the load balancing function is enabled. However, topology event information is reported only on the nodes where the backend service endpoints are located. The health monitoring module is responsible for performing a health detection based on the backend service endpoint information issued by the control module. It should be noted that the control module may perceive the link statuses and health statuses of the backend service endpoints based on a monitoring result of the health monitoring module. The event processing module is responsible for the generation and processing of events, and is a message transferring channel between the modules.

In this embodiment, the user enables the load balancing function and configures the backend service endpoints as required. Generally, different backend service endpoints are deployed on different nodes for disaster recovery, high availability and other factors. Upon receiving the load balancing configuration information from the user, the control module issues rules to nodes based on the configuration information. If the backend service endpoints for load balancing are located on the same node, the backend service endpoints do not need to be polled based on the topology information reported by the topology awareness module. If the backend service endpoints for load balancing are located on different nodes, the control module firstly polls the backend service endpoints based on the health statuses of the backend service endpoints sent by the health monitoring module to ensure the immediate availability of the load balancing services; moreover, the topology awareness modules on the nodes start to perceive and upload the topology information of the backend service endpoints to the control module; and after obtaining the topology information of the backend service endpoints sent by all nodes, the control module selects the optimal backend service endpoint through comprehensive calculation based on the topology information of the backend service endpoints and the link quality and health statuses of the backend service endpoints reported by the health monitoring module, and adjusts the priority of each backend service endpoint, such that the backend service endpoint with the optimal topology and link quality is preferably selected as the service response endpoint for load balancing.

In this embodiment, if the topology of the backend service endpoints for load balancing changes during the system running, the topology detection module reports a new topology relationship, and the control module recalculates, based on the latest topology information and health detection information, whether to adjust the priorities of the backend service endpoints to achieve the optimal network performance.

In some embodiments of the present disclosure, the method further includes: regularly polling, by the topology awareness module of each of the different nodes, the backend service endpoints on the respective node to acquire the topology information of these different nodes, and uploading the topology information to the control module; and regularly polling, by the health monitoring module of each of the different nodes, the backend service endpoints on the respective node to acquire the health statuses and link information of these backend service endpoints, and uploading the health statuses and the link information to the control module.

In some embodiments of the present disclosure, in response to the topology information being changed and/or the health statuses and/or the link quality being changed includes: acquiring current topology information by the topology awareness module, and determining whether the current topology information is the same as topology information last obtained; in response to the current topology information being different from the topology information last obtained, determining that the topology information is changed, and uploading the current topology information to the control module; and acquiring current health statuses and current link information by the health monitoring module, uploading the current health statuses and the current link information to the control module, and determining, by the control module, whether the health statuses and the link quality are changed based on the current health statuses, the current link information, and health statuses and link information last obtained.

In this embodiment, the topology awareness module is configured to perceive the topology information of the backend service endpoints on the nodes based on the received information of the backend service endpoints for load balancing, and report the perceived topology information to the control module through the event processing module. Moreover, if the topology of the backend service endpoints on the current node changes, the topology awareness module reports a changed topology relationship to the control module again.

In this embodiment, the health monitoring module is responsible for detecting the health statuses of the backend service endpoints for load balancing. Moreover, the health monitoring module also acquires network link status information of the backend service endpoints, and finally transmits the detected information to the control module through the event processing module for unified processing by the control module.

In some embodiments of the present disclosure, the method further includes: in response to the current topology information being the same with the topology information last obtained, determining that the topology information is not changed, and omitting uploading the current topology information to the control module.

In this embodiment, the topology awareness module is configured to perceive the topology information of the backend service endpoints on the nodes based on the received information of the backend service endpoints for load balancing. If the topology on the current node does not change, the topology awareness module enters a silent mode and only collects but does not report the topology relationship of the backend service endpoints, so as to reduce the system loads and save network bandwidth resources.

In some embodiments of the present disclosure, the priorities of the backend service endpoints are calculated based on the topology information, the health statuses and the link quality as follows: calculating an average link overhead based on link overheads in the link quality; and calculating load balancing priorities of the backend service endpoints based on the average link overhead, a topology weight, a link weight, a link overhead weight, a link stability weight, and a delayed change weight.

In some embodiments of the present disclosure, calculating load balancing priorities of the backend service endpoints based on the average link overhead, a topology weight, a link weight, a link overhead weight, a link stability weight, and a delayed change weight includes calculating the priorities of the backend service endpoints through the following formula:

$$P = A_1 T + A_2 \left( A_3 M + A_4 \left( \frac{(x_1 - M)^2 + (x_2 - M)^2 + \ldots + (x_n - M)^2}{n} \right) \right) + L$$

where $A_1$ represents the topology weight of a topology T, $A_2$ represents the link weight, $x_1, x_2, \ldots,$ and $x_n$ represent the link overheads of corresponding links, $A_3$ represents the link overhead weight, $A_4$ represents the link stability weight, L represents the delayed change weight, and M represents the average link overhead.

In this embodiment, the average link overhead M is calculated by using the following method:

$$M = \frac{x_1 + x_2 + \ldots + x_n}{n}$$

where $x_1, x_2, \ldots,$ and $x_n$ represent the link overheads of corresponding links.

In this embodiment, taking three nodes as an example, the load balancing priority P is calculated as follows:

$$P = A_1 T + A_2 \left( A_3 M + A_4 \left( \frac{(x_1 - M)^2 + (x_2 - M)^2 + (x_3 - M)^2}{3} \right) \right) + L$$

$$M = \frac{x_1 + x_2 + x_3}{n}$$

In some embodiments of the present disclosure, the service response endpoint for load balancing is configured based on the priorities as follows: ranking the priorities of the backend service endpoints from high to low, and selecting a backend service endpoint with the highest priority as the service response endpoint for load balancing.

In some embodiments of the present disclosure, the service response endpoint is adjusted based on the priorities as follows: ranking the recalculated priorities of the backend service endpoints from high to low, and selecting a backend service endpoint with the recalculated highest priority as the service response endpoint for load balancing.

It should be pointed out that the steps in each embodiment of the topology-aware load balancing method may be crossed, replaced, added, and deleted, therefore, these reasonable permutations and combinations of the topology-aware load balancing method shall also fall within the protection scope of the present disclosure, and the protection scope of the present disclosure shall not be limited to the embodiments.

The present disclosure has the following beneficial technical effects: the problems that in an environment of large-scale data centers, the load balancing performance is poor and links may not be adjusted in real time based on the topology statuses of the backend service endpoints for load balancing are solved; and by perceiving the topology of the backend service endpoints of a load balancer and adjusting load balancing based on a topology perception result, load balancing performance is optimized, and network bandwidth resource utilization rate and user experience are greatly improved.

Figure 2:
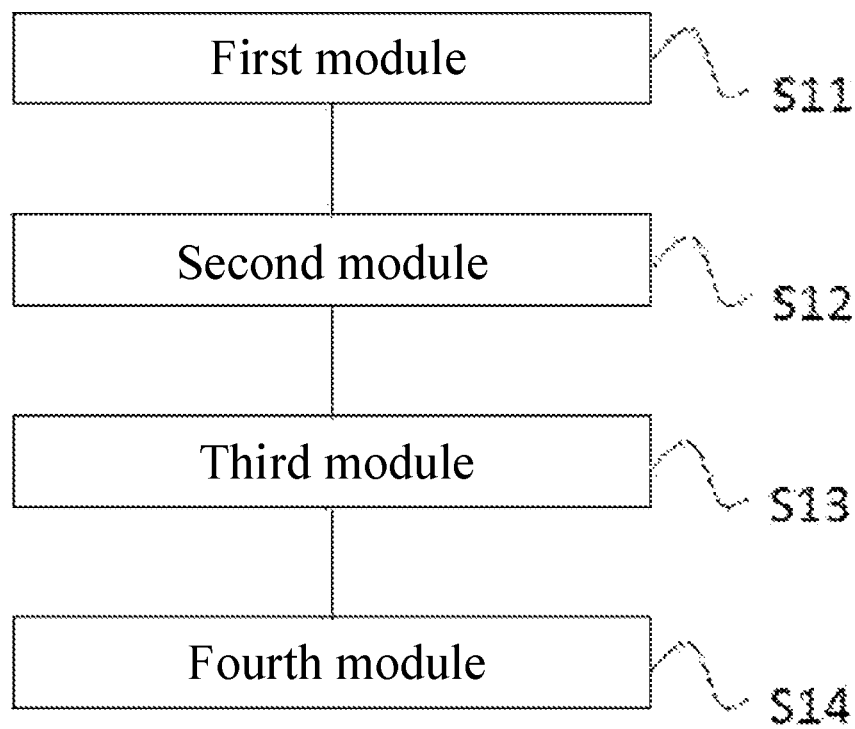
FIG. 2 is a schematic diagram illustrating a topology-aware load balancing apparatus according to an embodiment of the present disclosure.

In view of the above object, in a second aspect of the embodiments of the present disclosure, a topology-aware load balancing apparatus is provided. FIG. 2 is a schematic diagram illustrating a topology-aware load balancing apparatus according to an embodiment of the present disclosure. As shown in FIG. 2, the embodiment of the present disclosure includes: a first module S11, configured to acquire load balancing configuration information issued by a user, and determine, based on the configuration information, whether a plurality of backend service endpoints for load balancing are located on different nodes; a second module S12, configured to, for each of the different nodes, regularly issue a command for polling the backend service endpoints on respective nodes in response to the plurality of backend service endpoints for load balancing being located on different nodes, and acquire topology information of different nodes as well as health statuses and a link quality of the backend service endpoints; a third module S13, configured to calculate priorities of the backend service endpoints based on the topology information, the health statuses and the link quality, and configure a service response endpoint for load balancing based on the priorities; and a fourth module S14, configured to recalculate, in response to determining that the topology information changes and/or the health statuses and/or the link quality changes, priorities of the backend service endpoints, and adjust the service response endpoint based on the priorities.

Figure 3:
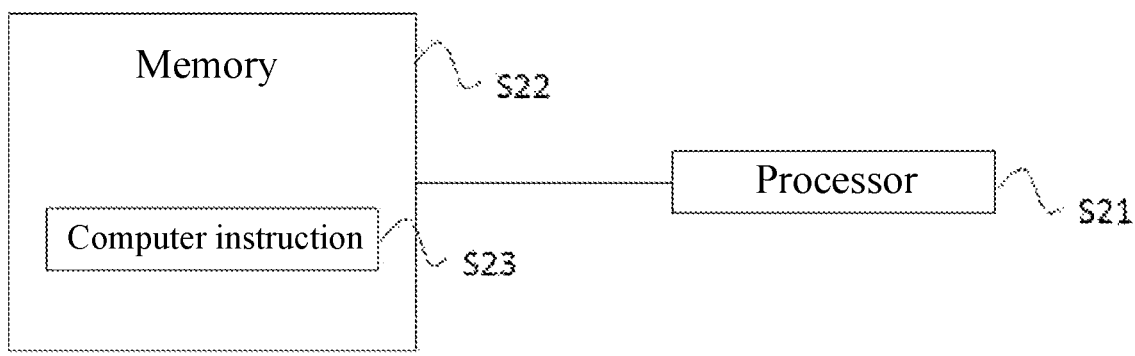
FIG. 3 is a schematic diagram illustrating a computer device according to an embodiment of the present disclosure.

In view of the above object, in a third aspect of the embodiments of the present disclosure, a computer device is provided. FIG. 3 is a schematic diagram illustrating a computer device according to an embodiment of the present disclosure. As shown in FIG. 3, the embodiment of the present disclosure includes: at least one processor S21; and a memory S22. The memory S22 is stored with a computer instruction S23 that is executable on the processor, and the instruction, when executed by the processor, performs the steps of the above-mentioned method.

Finally, it should be noted that those skilled in the art can understand that all or part of the processes in the methods of the above embodiments can be implemented by instructing related hardware through computer programs. The program of the topology-aware load balancing method can be stored in a computer readable storage medium. The program, when being executed, may include the procedures of the embodiments of the above-mentioned methods. The storage medium of the program may be a magnetic disk, an optical disk, a read-only memory (ROM) or a random access memory (RAM), and the like. The above computer program embodiments can achieve the same or similar effects as that of any of the above corresponding method embodiments.

In addition, the method disclosed by the embodiment of the present disclosure may also be implemented as a computer program executed by a processor, and the computer program may be stored in a computer-readable storage medium. When the computer program is executed by the processor, the above functions defined in the methods of the embodiments of the present application are executed.

In addition, the above-mentioned method steps and system units can also be realized by a controller and a computer-readable storage medium for storing a computer program that enables the controller to realize the functions of the above-mentioned steps or units.

Those skilled in the art would also appreciate that the various illustrative logical blocks, modules, circuits, and algorithm steps described in connection with the disclosure herein may be implemented as electronic hardware, computer software, or combinations of both. To clearly illustrate such interchangeability of hardware and software, various illustrative components, blocks, modules, circuits, and steps have been described generally in terms of their functionality. Whether such functionality is implemented as software or as hardware depends upon the particular application and design constraints imposed on the overall system. Those skilled in the art may implement the functions in various ways for each specific application, but such implementation decisions should not be interpreted as causing a departure from the scope disclosed in the embodiments of the present application.

In one or more exemplary designs, functions may be implemented in hardware, software, firmware, or any combination thereof. When being implemented in software, the functions may be stored as one or more instructions or codes on computer-readable media or transmitted through the computer-readable media. Computer-readable media include computer storage media and communication media, and the communication media include any medium that facilitates transferring a computer program from one place to another. Storage media may be any available media that can be accessed by a general purpose or special purpose computer. A nonrestrictive example of the computer readable medium may include RANI, ROM, EEPROM, CD-ROM or other optical disk storage device, magnetic disk storage device or other magnetic storage device, or any other medium that may be used to carry or store program codes in forms of instructions or data structures and can be accessed by a general purpose or special purpose computer or a general purpose or special purpose processor. Further, any connection is properly termed as a computer-readable medium. For example, if the software is transmitted from a website, server, or other remote source using coaxial cables, fiber optic cables, twisted pair cabling, digital subscriber lines (DSL), or wireless technologies such as infrared, radio, and microwave, then the coaxial cables, fiber optic cables, twisted pair cabling, DSL, or wireless technologies such as infrared, radio, and microwave are included in the definition of media. Magnetic disk and optical disc, as used herein, includes compact disc (CD), laser disc, optical disc, digital versatile disc (DVD), floppy disk, blue-ray disc, and magnetic disks usually reproduce data magnetically, while optical discs reproduce data optically with lasers. Combinations of the above should also be included within the scope of computer-readable media.

The above are exemplary embodiments of in the present disclosure, but it should be noted that various changes and modifications can be made without departing from the scope of the embodiments of the present disclosure defined by the claims. The functions, steps and/or actions of the method claims in accordance with the embodiments described herein need not be performed in any particular order. In addition, although the elements disclosed in the embodiments may be described or required in an individual form, they may also be understood as plural unless explicitly limited to a singular number.

It should be understood that a singular form "a" and "an" as used herein is intended to include the plural forms as well, unless the context clearly supports an exception. It should also be understood that "and/or" as used herein is meant to include any and all possible combinations of one or more of the associated listed items.

The serial numbers of the embodiments disclosed above are only for description, and do not represent the advantages and disadvantages of the embodiments.

Those skilled in the art can understand that all or part of the steps for implementing the above-mentioned embodiments can be completed by hardware, or can be completed by instructing related hardware through a program, and the program can be stored in a computer-readable storage medium. The above-mentioned storage medium may be a read-only memory, a magnetic disk or an optical disk, and the like.

Those skilled in the art should understand that the discussion of any of the above embodiments is exemplary only, and is not intended to imply that the scope (including claims) of the embodiments of the present disclosure is limited to these examples. Under the idea of the embodiments of the present disclosure, the technical features in the above embodiments or different embodiments can also be combined, and there are many other changes in different aspects of the above embodiments of the present disclosure, which are not provided in details for the sake of brevity. Therefore, within the spirit and principle of the embodiments of the present disclosure, any omissions, modifications, equivalent replacements, improvements, etc., shall be included in the protection scope of the embodiments of the present disclosure.

The invention claimed is:

1. A topology-aware load balancing method, comprising:
   acquiring load balancing configuration information issued by a user, and determining, based on the configuration information, whether a plurality of backend service endpoints for load balancing are located on different nodes;
   in response to determining that the plurality of backend service endpoints for load balancing are located on different nodes, for each of the different nodes, regularly issuing a command for polling the backend service endpoints on the respective node, and acquiring topology information of the different nodes, as well as health statuses and a link quality of the plurality of backend service endpoints;
   calculating priorities of the plurality of backend service endpoints based on the topology information, the health statuses and the link quality, and configuring a service response endpoint for load balancing based on the priorities; and
   in response to at least one of the topology information, the health statuses and the link quality being changed, recalculating priorities of the plurality of backend service endpoints, and adjusting the service response endpoint based on the priorities.

2. The topology-aware load balancing method according to claim 1, further comprising:
   regularly polling, by a topology awareness module of each of the different nodes, the backend service endpoints on the respective node to acquire the topology information of each of the different nodes, and uploading the topology information to a control module; and
   regularly polling, by a health monitoring module of each of the different nodes, the backend service endpoints on the respective node to acquire the health statuses and link information of the backend service endpoints, and uploading the health statuses and the link information to the control module.

3. The topology-aware load balancing method according to claim 2, wherein in response to at least one of the topology information, the health statuses and the link quality being changed comprises:

acquiring, by the topology awareness module, current topology information, and determining whether the current topology information is same as topology information last obtained;

in response to the current topology information being different from the topology information last obtained, determining that the topology information is changed, and uploading the current topology information to the control module; and acquiring, by the health monitoring module, current health statuses and current link information, uploading the current health statuses and the current link information to the control module, and determining whether the health statuses and the link quality are changed by the control module based on the current health statuses, the current link information, and health statuses and link information last obtained.

4. The topology-aware load balancing method according to claim 3, further comprising:

in response to the current topology information being the same with the topology information last obtained, determining that the topology information is not changed, and omitting uploading the current topology information to the control module.

5. The topology-aware load balancing method according to claim 1, wherein the calculating priorities of the plurality of backend service endpoints based on the topology information, the health statuses and the link quality comprises:

calculating an average link overhead based on link overheads in the link quality, and calculating, based on the average link overhead, a topology weight, a link weight, a link overhead weight, a link stability weight and a delayed change weight, load balancing priorities of the plurality of backend service endpoints.

6. The topology-aware load balancing method according to claim 5, wherein the calculating, based on the average link overhead, a topology weight, a link weight, a link overhead weight, a link stability weight and a delayed change weight, load balancing priorities of the plurality of backend service endpoints comprises:

calculating the priorities of the plurality of backend service endpoints through the following formula:

$$P = A_1 T + A_2 \left( A_3 M + A_4 \left( \frac{(x_1 - M)^2 + (x_2 - M)^2 + \ldots + (x_n - M)^2}{n} \right) \right) + L$$

wherein $A_1$ represents the topology weight of a topology T, $A_2$ represents the link weight, $x_1, x_2, \ldots,$ and $x_n$ represent the link overhead of a respective link, $A_3$ represents the link overhead weight, $A_4$ represents the link stability weight, L represents the delayed change weight, and M represents the average link overhead.

7. The topology-aware load balancing method according to claim 1, wherein the configuring a service response endpoint for load balancing based on the priorities comprises:

ranking the priorities of the plurality of backend service endpoints from high to low, and taking a backend service endpoint with the highest priority as the service response endpoint for load balancing.

8. The topology-aware load balancing method according to claim 1, wherein the adjusting the service response endpoint based on the priorities comprises:

ranking the recalculated priorities of the plurality of backend service endpoints from high to low, and taking a backend service endpoint with the recalculated highest priority as the service response endpoint for load balancing.

9. A computer device, comprising:

at least one processor; and a memory storing a computer instruction that, when executed by the processor, causes the processor to perform operations of:

acquiring load balancing configuration information issued by a user, and determining, based on the configuration information, whether a plurality of backend service endpoints for load balancing are located on different nodes;

in response to determining that the plurality of backend service endpoints for load balancing are located on different nodes, for each of the different nodes, regularly issuing a command for polling the backend service endpoints on the respective node, and acquiring topology information of the different nodes, as well as health statuses and a link quality of the plurality of backend service endpoints;

calculating priorities of the plurality of backend service endpoints based on the topology information, the health statuses and the link quality, and configuring a service response endpoint for load balancing based on the priorities; and in response to at least one of the topology information, the health statuses and the link quality being changed, recalculating priorities of the plurality of backend service endpoints, and adjusting the service response endpoint based on the priorities.

10. The topology-aware load balancing method according to claim 4, wherein in response to determining that the topology information is not changed, the topology awareness module enters a silent mode and only collects but does not report topology relationships of the backend service endpoints.

11. The topology-aware load balancing method according to claim 6, wherein the average link overhead M is calculated by using the following method:

$$M = \left( \frac{x_1 + x_2 + \ldots + x_n}{n} \right)$$

where n represents a number of nodes.

12. The computer device according to claim 9, wherein the processor is further configured to perform operations of:

regularly polling, by a topology awareness module of each of the different nodes, the backend service endpoints on the respective node to acquire the topology information of each of the different nodes, and uploading the topology information to a control module; and regularly polling, by a health monitoring module of each of the different nodes, the backend service endpoints on the respective node to acquire the health statuses and link information of the backend service endpoints, and uploading the health statuses and the link information to the control module.

13. The computer device according to claim 12, wherein in response to at least one of the topology information, the health statuses and the link quality being changed comprises:

acquiring, by the topology awareness module, current topology information, and determining whether the current topology information is same as topology information last obtained;

in response to the current topology information being different from the topology information last obtained, determining that the topology information is changed, and uploading the current topology information to the control module; and acquiring, by the health monitoring module, current health statuses and current link information, uploading the current health statuses and the current link information to the control module, and determining whether the health statuses and the link quality are changed by the control module based on the current health statuses, the current link information, and health statuses and link information last obtained.

14. The computer device according to claim 13, the processor is further configured to perform operations of:

in response to the current topology information being the same with the topology information last obtained, determining that the topology information is not changed, and omitting uploading the current topology information to the control module.

15. The computer device according to claim 9, wherein the calculating priorities of the plurality of backend service endpoints based on the topology information, the health statuses and the link quality comprises:

calculating an average link overhead based on link overheads in the link quality, and calculating, based on the average link overhead, a topology weight, a link weight, a link overhead weight, a link stability weight and a delayed change weight, load balancing priorities of the plurality of backend service endpoints.

16. The computer device according to claim 15, wherein the calculating, based on the average link overhead, a topology weight, a link weight, a link overhead weight, a link stability weight and a delayed change weight, load balancing priorities of the plurality of backend service endpoints comprises:

calculating the priorities of the plurality of backend service endpoints through the following formula:

$$P = A_1 T + A_2 \left( A_3 M + A_4 \left( \frac{(x_1 - M)^2 + (x_2 - M)^2 + \ldots + (x_n - M)^2}{n} \right) \right) + L$$

wherein $A_1$ represents the topology weight of a topology T, $A_2$ represents the link weight, $x_1, x_2, \ldots,$ and $x_n$ represent the link overhead of a respective link, $A_3$ represents the link overhead weight, $A_4$ represents the link stability weight, L represents the delayed change weight, and M represents the average link overhead.

17. The computer device according to claim 9, wherein the configuring a service response endpoint for load balancing based on the priorities comprises:

ranking the priorities of the plurality of backend service endpoints from high to low, and taking a backend service endpoint with the highest priority as the service response endpoint for load balancing.

18. The computer device according to claim 9, wherein the adjusting the service response endpoint based on the priorities comprises:

ranking the recalculated priorities of the plurality of backend service endpoints from high to low, and taking a backend service endpoint with the recalculated highest priority as the service response endpoint for load balancing.

19. The computer device according to claim 16, wherein the average link overhead M is calculated by:

$$M = \left( \frac{x_1 + x_2 + \ldots + x_n}{n} \right)$$

where n represents a number of nodes.

20. The computer device according to claim 14, wherein the processor is further configured to perform operations of:

in response to determining that the topology information is not changed, the topology awareness module enters a silent mode and only collects but does not report topology relationships of the backend service endpoints.

* * * * *